United States Patent
Bury

(10) Patent No.: US 8,905,367 B2
(45) Date of Patent: Dec. 9, 2014

(54) RETAINING DEVICE

(75) Inventor: Henryk Bury, Loehne (DE)

(73) Assignee: Bury SP.Z.O.O., Mielec (PL)

( * ) Notice: Subject to any disclaimer, the term of this patent is extended or adjusted under 35 U.S.C. 154(b) by 105 days.

(21) Appl. No.: 13/610,084

(22) Filed: Sep. 11, 2012

(65) Prior Publication Data

US 2013/0068908 A1 Mar. 21, 2013

(30) Foreign Application Priority Data

Sep. 15, 2011 (DE) .......................... 10 2011 116 097

(51) Int. Cl.
*A47G 1/10* (2006.01)
*B60R 11/02* (2006.01)
*B60R 11/00* (2006.01)

(52) U.S. Cl.
CPC ............. *B60R 11/0235* (2013.01); *B60R 11/02* (2013.01); *B60R 11/0241* (2013.01); *B60R 11/0252* (2013.01); *B60R 11/0258* (2013.01); *B60R 2011/0017* (2013.01); *B60R 2011/0059* (2013.01); *B60R 2011/0071* (2013.01); *B60R 2011/0075* (2013.01); *B60R 2011/0085* (2013.01); *B60R 2011/0288* (2013.01); *Y10S 248/921* (2013.01); *Y10S 224/929* (2013.01)
USPC ...................... 248/316.4; 248/278.1; 248/921; 379/455; 224/929

(58) Field of Classification Search
CPC ..... F16M 13/00; F16M 11/041; F16M 11/10; F16M 13/02; F16M 11/04; F16M 11/12; B60R 2011/0071; B60R 11/0241; B60R 11/02; B60R 11/0252; B60R 2011/0075; B60R 2011/0087; B60R 11/0235; B60R 11/0258; B60R 2011/0003; H04M 1/04

USPC ............ 248/278.1, 451, 309.1, 316.4, 316.6, 248/316.1, 921; 379/455, 454; D14/253; 224/929; 455/569.2

See application file for complete search history.

(56) References Cited

U.S. PATENT DOCUMENTS

| | | | | |
|---|---|---|---|---|
| 3,076,285 | A | * | 2/1963 | Sparkman ..................... 248/448 |
| 5,433,415 | A | * | 7/1995 | Samson et al. ................ 248/448 |
| 5,457,745 | A | * | 10/1995 | Wang ............................. 379/454 |
| 7,537,190 | B2 | * | 5/2009 | Fan ............................. 248/309.1 |
| 7,669,816 | B2 | * | 3/2010 | Crain et al. ................. 248/183.3 |
| 7,672,701 | B2 | * | 3/2010 | Piekarz ....................... 455/575.9 |

(Continued)

FOREIGN PATENT DOCUMENTS

| | | |
|---|---|---|
| DE | 202005015757 U1 | 12/2005 |
| DE | 202008010368 U1 | 1/2009 |

(Continued)

*Primary Examiner* — Bradley Duckworth
(74) *Attorney, Agent, or Firm* — Whitham Curtis Christofferson & Cook, PC

(57) ABSTRACT

A retaining device for fastening a piece of equipment with a display inside a motor vehicle has a holding apparatus with a bearing surface and a holding space for holding the piece of equipment. The holding space extends in a first direction ($R_1$) up to a first maximum extent, and extends in a second direction ($R_2$) perpendicular to the first direction ($R_1$). For pieces of equipment that are smaller, the amount by which the holding space extends in the first direction ($R_1$) can be adjusted to the length of the piece of equipment and the amount by which the holding space extends in the second direction ($R_2$) can be adjusted to its width. For pieces of equipment that are longer, the holding space can be adjusted to the width and the amount by which the holding space extends in the second direction ($R_2$) can be adjusted to its length.

11 Claims, 14 Drawing Sheets

(56) References Cited

U.S. PATENT DOCUMENTS

| | | | |
|---|---|---|---|
| 7,753,330 B2* | 7/2010 | Brief | 248/278.1 |
| 7,878,471 B2* | 2/2011 | Unsworth et al. | 248/278.1 |
| 7,918,427 B2* | 4/2011 | Wang | 248/278.1 |
| 7,967,269 B2* | 6/2011 | Liu | 248/287.1 |
| 8,027,464 B2* | 9/2011 | Piekarz | 379/455 |
| 8,099,138 B2* | 1/2012 | Piekarz | 455/569.2 |
| 8,118,272 B2* | 2/2012 | Liou | 248/287.1 |
| 8,240,628 B2* | 8/2012 | Huang | 248/316.1 |
| 8,376,301 B2* | 2/2013 | Fan | 248/316.4 |
| 8,413,943 B1* | 4/2013 | Li | 248/454 |
| 8,424,825 B2* | 4/2013 | Somuah | 248/316.4 |
| 8,469,325 B2* | 6/2013 | Yu | 248/316.1 |
| 8,622,359 B2* | 1/2014 | Carnevali | 248/316.1 |
| 2006/0215836 A1* | 9/2006 | Wang | 379/455 |
| 2006/0278788 A1* | 12/2006 | Fan | 248/309.1 |
| 2009/0218454 A1* | 9/2009 | Stanley | 248/121 |
| 2009/0294617 A1* | 12/2009 | Stacey et al. | 248/316.1 |
| 2010/0294908 A1* | 11/2010 | Mish et al. | 248/451 |
| 2011/0226918 A1* | 9/2011 | Hirschhorn | 248/278.1 |
| 2012/0126083 A1* | 5/2012 | Nemoto | 248/316.4 |
| 2012/0312936 A1* | 12/2012 | Huang | 248/122.1 |
| 2013/0134284 A1* | 5/2013 | Hu et al. | 248/451 |
| 2014/0042285 A1* | 2/2014 | Carnevali | 248/316.4 |

FOREIGN PATENT DOCUMENTS

| | | |
|---|---|---|
| DE | 102008053975 A1 | 5/2010 |
| DE | 102010006261 A1 | 8/2011 |
| EP | 1894788 A1 | 3/2008 |
| EP | 2386448 A1 | 11/2011 |
| EP | 2416049 A2 | 2/2012 |

* cited by examiner

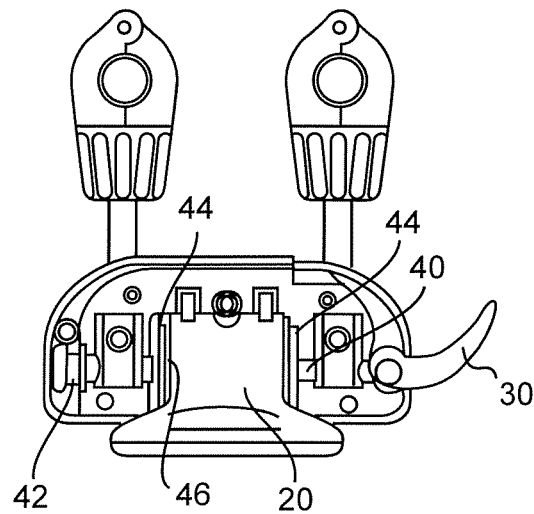
Figure 7B
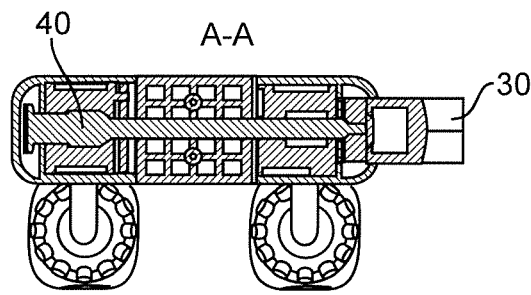
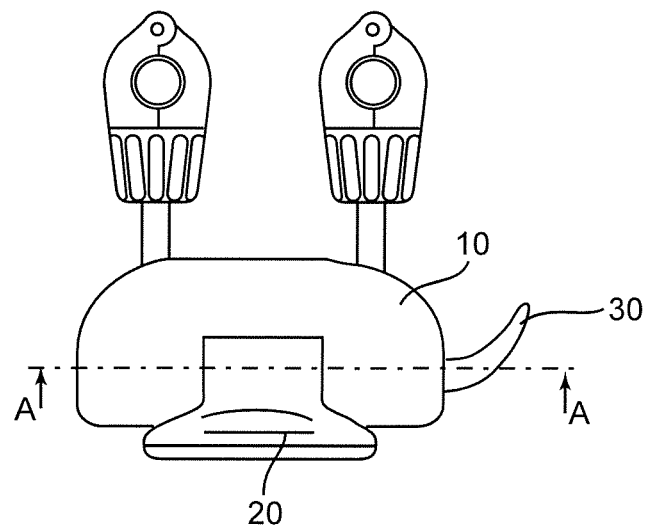
Figure 7A

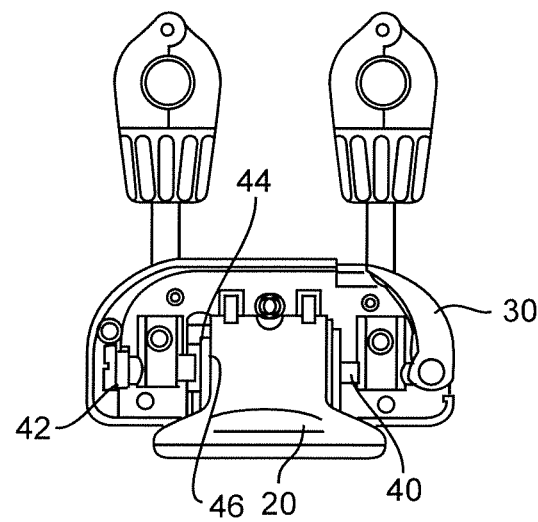
*Figure 8B*
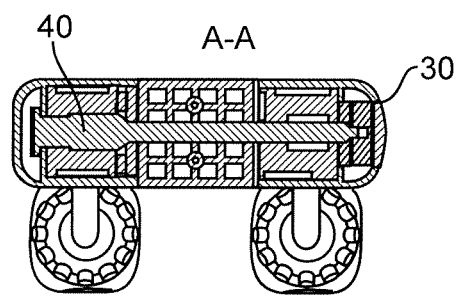
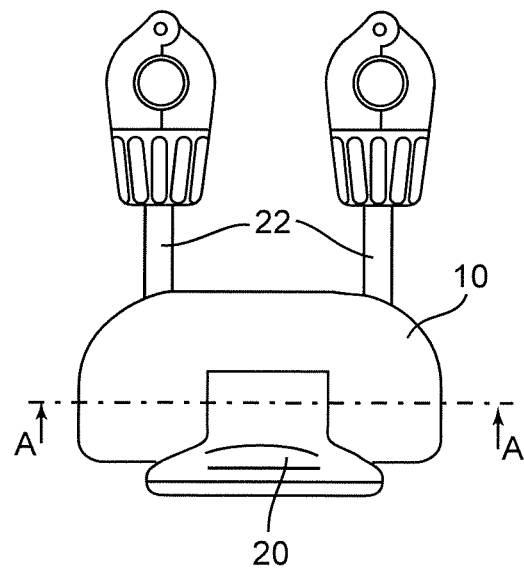
*Figure 8A*

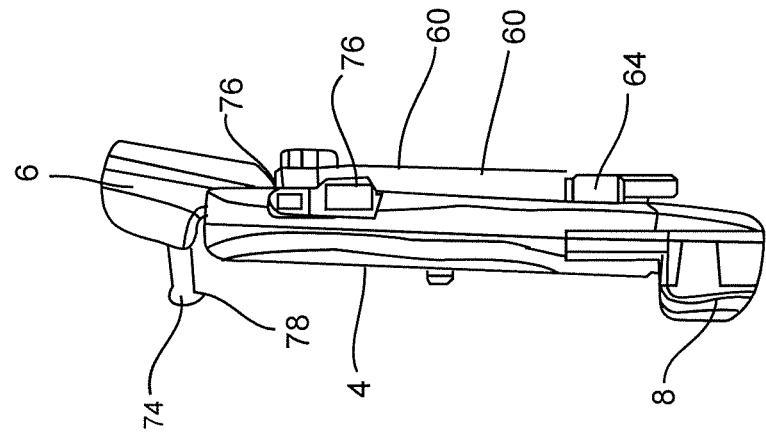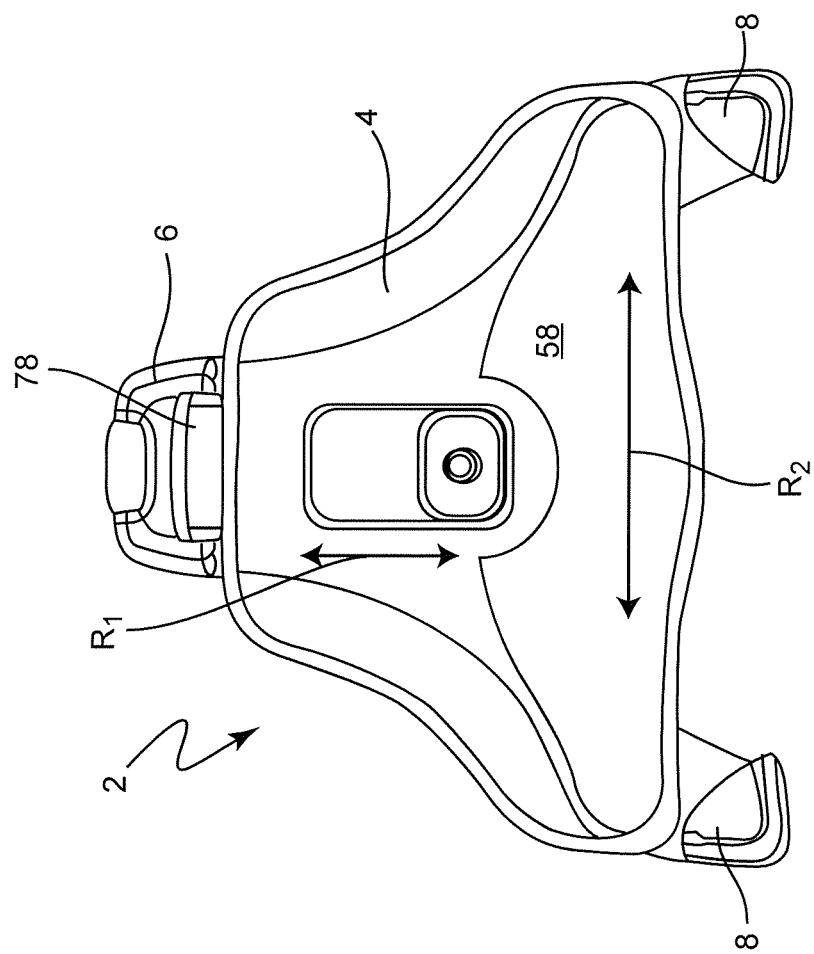
Figure 14

RETAINING DEVICE

FIELD OF THE INVENTION

The invention relates to a retaining device for fastening a piece of equipment equipped with a display inside a motor vehicle, the piece of equipment having a length and a width where the width is less than the length.

BACKGROUND

A wide range of devices are known from the prior art, by means of which pieces of equipment equipped with a display, for example navigation systems or mobile phones, can be fastened inside a motor vehicle. It is, for example, known to fasten such pieces of equipment to the windscreen of the motor vehicle by means of a retaining device via a suction pad. The pieces of equipment attached there can thereby be easily seen and operated by the driver of the motor vehicle so that he does not need to concentrate much on these pieces of equipment.

The pieces of equipment that need to be operated or consulted by the driver or front-seat passenger of a motor vehicle whilst driving are usually navigation systems or mobile phones. These pieces of equipment are handy, small and relatively light. The situation is different for passengers in a motor vehicle who are seated on the rear seat. Managers and businesspeople in particular use the time that they have to spend in a car to keep track of their work, for example to peruse documents and read and answer emails. Nowadays this is done, for example, on so-called tablet PCs or computers that are much bigger than the navigation systems and mobile phones used in the front part of the motor vehicle.

It can be useful for families, for example when driving on holiday, to allow the children sitting on the back seat to watch a film while driving, for example. Portable CD, DVD or Blu-Ray players are currently available to allow this. Like the abovementioned tablet PCs, these pieces of equipment also need to be arranged within the field of vision of the respective passenger on the back seat of the motor vehicle in such a way that they can be seen and operated easily whilst being securely and safely fastened in place.

Arrangement by means of a suction pad, for example on the side window of a motor vehicle, is extremely unsuitable for this.

A retaining system for a mobile phone is disclosed in U.S. Pat. No. 5,457,745 with a length, width and height that can be adapted to the dimensions of the mobile phone. However, because they are intended to hold only mobile phones, the range over which the retaining system can be adjusted is limited.

DE 10 2008 053 975 A1 discloses a retaining system for a portable computer that has two elongated telescopic columns with a corner insert. The computer rests on a bearing section and is then, after the telescopic columns have been adapted to the length of the computer, gripped by coupling sections that have straps. However, in this case too only portable computers can be used in the retaining system so that the range over which the telescopic columns can be adjusted is limited.

DE 20 2005 015 757 U1 discloses a retaining device in which a transportable piece of electronic equipment, for example an MP3 player, can be arranged, a connection being made with the data transmission interface and also being used to provide mechanical stabilization.

DE 10 2010 006 261 A1 discloses a device for attaching a tablet computer to the rear of the seat of a vehicle.

The retaining system has a holding part into which the tablet PC is fitted. It is then housed so that it can pivot and rotate so that it can be moved into a position that is as comfortable as possible for the user.

SUMMARY

The object of the invention is thus to propose a retaining device with which even large pieces of equipment equipped with a display can be fastened securely, simply and flexibly in a motor vehicle. The retaining device can additionally be easily converted and adapted for different pieces of equipment, so that swapping the piece of equipment to be retained can also be performed simply, quickly and comfortably.

The invention solves the object set with a retaining device for fastening a piece of equipment equipped with a display inside a motor vehicle, the piece of equipment having a length and a width where the width is less than the length and the retaining device comprising a holding apparatus with a bearing surface and a holding space for holding the piece of equipment, the said holding space extending in a first direction by an amount that is limited by at least one displaceable first retaining element and can be enlarged up to a maximum extent, and extending in a second direction perpendicular to the first direction by an amount that is limited by at least one displaceable second retaining element, it being possible to displace the at least one first retaining element and the at least one second retaining element in such a way that, for pieces of equipment that are smaller than the first maximum extent, the amount by which the holding space extends in the first direction can be adjusted to the length of the piece of equipment and the amount by which the holding space extends in the second direction can be adjusted to its width, and, for pieces of equipment that are longer than the first maximum extent, in such a way that the amount by which the holding space extends in the first direction can be adjusted to the width of the piece of equipment and the amount by which the holding space extends in the second direction can be adjusted to its length.

Pieces of equipment equipped with a display are usually right-angled and rectangular in design, even if for some individual pieces of equipment the actual corners may be very rounded in design. The pieces of equipment thus have two opposing long sides that extend by an amount defining the length of the piece of equipment and have two opposing short sides that extend by an amount defining the width of the piece of equipment. It is thus also clear that the width is always less than the length of the piece of equipment.

The holding apparatus of the retaining device has a holding space into which the piece of equipment is inserted. It is delimited to the rear by the bearing surface. The holding space is additionally delimited by at least one first retaining element and at least one second retaining element, both of which can be displaced. Because these retaining elements can be displaced, the amounts by which the holding space extend in a first direction and in a second direction can be adapted to the size of the piece of equipment to be held. It can thereby be ensured that a piece of equipment inserted into the retaining device is retained securely and safely in the retaining device, and is not thrown out of the retaining system even in the event of vibrations as may be caused, for example, by jolting when moving off or braking or driving over a pothole.

The bigger the differences in sizes of the pieces of equipment to be held in the retaining device, the larger the range over which it must be designed that both the at least one first displaceable retaining element and the at least one second displaceable retaining element can be displaced. The width/ length ratios of pieces of equipment that are equipped with a display mostly correspond at least approximately to that of the display. Common formats are consequently 4:3, 16:9 or similar ratios. Because these width/length ratios all move within approximately the same range, both the amount by which the holding space extends in the first direction and the amount by which the holding space extends in the second direction have to be adapted to these changing dimensions so that the respective retaining elements all need to be designed so that they can be displaced over a relatively large range. The further it is intended for the individual retaining elements to be displaceable, the greater the structural complexity involved. In addition, the demands on the stability of the respective retaining elements increase at the same time as the range over which it is intended for them to be displaced.

By virtue of the design of the retaining device according to the invention, this complexity is limited in a particularly simple and elegant way, at least for one of the retaining elements. The amount by which the holding space extends in a first direction can thus be enlarged up to a maximum extent. If a piece of equipment is now inserted into the retaining device and has a length that is shorter than this maximum extent, the at least one displaceable first retaining element is displaced exactly so far that the amount by which the holding space extends in the first direction corresponds to the length of this piece of equipment. The at least one displaceable second retaining element is thus displaced so far that the amount by which the holding space extends in the second direction corresponds to the width of the piece of equipment.

However, if a piece of equipment is inserted into the retaining device and is longer than the first maximum extent, the first displaceable retaining element is displaced only so far that the amount by which the holding space extends in the first direction corresponds to the width of the piece of equipment which, as already explained, is always smaller than the length of the piece of equipment. Because the at least one first displaceable retaining element is always displaced so far that the amount by which the holding space extends in a first direction corresponds, for small pieces of equipment, to the length of the piece of equipment and, for large pieces of equipment, to the width of the piece of equipment, the at least one displaceable first retaining element needs to be displaced only over a relatively small range. It is nevertheless possible to hold pieces of equipment with very different dimensions in the retaining device. This is achieved by it being possible for the at least one displaceable second retaining element to be displaced over a correspondingly larger range so that the amount by which the holding space extends in the second direction can be adjusted, for small pieces of equipment, to the low width of the pieces of equipment and, for large pieces of equipment, to the relatively great length of the pieces of equipment. In principle, it is sufficient to provide a first and a second displaceable retaining element respectively for the adjustability of the amount by which the holding space extends in the first and second directions. The amount by which the holding space extends can then be limited on the side opposite the respective displaceable retaining element by a stationary retaining element.

In a particularly advantageous embodiment, two second retaining elements are provided with a spacing that defines the amount by which the holding space extends in the second direction. These two second retaining elements can, for example, be designed as corner retainers which are constructed so as to hold two corners of the piece of equipment. In this way, the two second retaining elements, on the one hand, define the amount by which the holding space extends in the second direction by their spacing, and at the same time ensure that it is not possible for a piece of equipment contained in the retaining device also to be displaced at least in one direction in a direction perpendicular to its extent.

The design with two second retaining elements with a spacing that defines the amount by which the holding space extends in the second direction has the advantage that both displaceable second retaining elements can contribute to the large change in the amount by which the holding space extends in the second direction. As already explained, the amount by which the holding space extends in the second direction must be varied by a much greater amount than the amount by which the holding space extends in the first direction. This can be achieved, for example, by a displaceable second retaining element that can be displaced over a large range. However, as already explained, this places greater demands on the stability of the second retaining element and makes the technical design of this displaceability relatively complicated. As described in the preferred embodiment, it is simpler to provide two displaceable second retaining elements that then need to be designed so as to be displaceable only half as far.

The individual retaining elements can, for example, be displaced in a stepless manner. This can be achieved, for example, by it being possible to slide a pin along in a slot provided for it. Once the desired position of the respective displaceable retaining element has been reached, the respective retaining element can be arrested in the desired position, for example via a clamping device, and thus fixed in place. Alternatively, it is of course also possible to design the individual retaining elements so that they can each be displaced in steps. This can, for example, be achieved by toothed elements that engage in one another such as, for example, two racks or discs equipped with teeth. Here too, the respective retaining element can be arrested in the desired position via a clamping or screw device. It is of course also conceivable to combine both options and design some of the retaining elements provided so as to be stepless and others so as to be displaceable only in small steps.

In a preferred embodiment, the first maximum extent up to which the amount by which the holding space extends in the first direction can be enlarged is selected such that a 7" tablet computer, such as that produced by Samsung for example, can, for example, be held in the retaining device by the first displaceable retaining element being displaced such that the amount by which the holding space extends in the first direction corresponds to the length of this piece of equipment. In this case, the at least one displaceable second retaining element is to be displaced in such a way that the amount by which the holding space extends in the second direction corresponds to the width of the 7" piece of equipment. This manner of holding a piece of equipment in the retaining device will be referred to below as "portrait orientation".

However, if a 10" tablet PC, such as that produced by Motorola for example, is inserted into the same retaining devices with the first maximum extent just selected, the length of the piece of equipment is greater than the first maximum extent. In this case, the first retaining element is consequently displaced in such a way that the amount by which the holding space extends in the first direction corresponds to the width of the piece of equipment. The at least one displaceable second retaining element must thus be displaced in such a way that the amount by which the holding space extends in the second direction corresponds to the length of the piece of equipment. This manner of holding a piece of equipment in the retaining device will be referred to below as "landscape orientation".

In particular where two second retaining elements are provided that are designed as corner elements such that they are provided so that they each hold one corner of the piece of equipment, it is ensured that pieces of equipment that have a relatively great weight can be stored securely in the retaining device even in the event of vibrations caused by driving. There is, for example, no problem in fastening securely pieces of equipment that weigh between 500 grams and 1 kilogram. Such pieces of equipment cannot be stowed, for example, using a conventional retaining system designed for mobile phones.

In a particularly preferred embodiment, the holding apparatus can be moved into a neutral position and into a first deflected position. It can thus be moved from the neutral position into the first deflected position by pivoting it by 90° about a first axis of pivoting that is perpendicular to the bearing surface. To return to the neutral position from the first deflected position, the holding apparatus must correspondingly be pivoted by 90° in the other direction. In this way, flexible use of the pieces of equipment held in the retaining device is ensured.

As already explained, small pieces of equipment are held in the retaining device in the portrait orientation and large pieces of equipment in the landscape orientation. However, because the holding apparatus is designed so that it can pivot itself by 90°, both types of pieces of equipment can be used in both portrait and landscape orientation. This is particularly useful when different orientations are advantageous for different uses of a piece of equipment, for example a tablet PC. Thus, when reading letters and other documents for example, it is advisable to view the tablet PC's display in portrait orientation, while it is more advisable to have the display in landscape orientation when watching a film, for example. Because the holding apparatus can be pivoted into the neutral position or the first deflected position, all these uses can be made in an optimal fashion.

It has here proven to be particularly advantageous if snap-in means are provided that ensure that the holding apparatus snaps into place in the neutral position and the first deflected position because in this case a particularly stable mounting of the piece of equipment situated in the retaining device is ensured. It would otherwise be possible for the holding apparatus to pivot at least partially about the first axis of pivoting when the vehicle takes a sharp bend.

In a particularly preferred embodiment, the corner retainers can be displaced independently of one another. Pieces of equipment that are intended to be inserted into a retaining device described here often have operating elements, such as volume adjusters or ports, for example, on their side faces so that they can be connected to other equipment, for example headphones, external hard drives or the like. In addition, disk drives that can open, such as CD, DVD or Blu-Ray disk drives for example, are often arranged on the side faces of the pieces of equipment. It may therefore occur that these elements are covered by retaining elements of the holding apparatus. In this case, they can no longer be accessed or used. This is a possibility in particular when at least one of the retaining elements is not designed as a corner retainer but is arranged on a side face of the piece of equipment that is inserted into the retaining device. By way of example, the embodiment is described here in which two second retaining elements are provided that are designed as corner retainers, while only one first displaceable retaining element is provided that is arranged at the two corners of the side face of the piece of equipment opposite the corner retainers. If an operating or a retaining element of the piece of equipment is now covered by this first displaceable retaining element, separate displacement of the two corner elements can ensure that the position at which the first displaceable retaining element bears against the side face of the piece of equipment is displaced relative to the piece of equipment. It is therefore no longer absolutely necessary that, for example, the first displaceable retaining element is always arranged in the centre of the respective side face.

The holding apparatus can advantageously be moved into a second deflected position by pivoting it out of the neutral position by −90° about the first axis of pivoting. If an operating element or a port is now covered by one or more of the displaceable retaining elements, the piece of equipment can, for example, also be inserted into the holding apparatus of the retaining device, rotated by 180°. Because the holding apparatus can, in addition to the neutral position and the first deflected position, also be moved into a second deflected position that is pivoted by 180° with respect to the first deflected position, the optimum orientation of the display of the piece of equipment can be obtained in this case too. Here too, snap-in means are preferably provided that ensure that the holding apparatus snaps into the second deflected position too so that secure retention is ensured here too.

The retaining device preferably has at least one power and/or data port for connection to a corresponding interface of the piece of equipment. The piece of equipment can be charged up via a power port whilst being held in the retaining device, or at least supplied with power, so that any batteries present in the piece of equipment do not need to be used. It is of course also conceivable to recharge these batteries in the retaining device. A data port can, for example, be a USB port or a headphone port, to which the respective connector of the piece of equipment can be connected. In addition, the piece of equipment can be connected via such a data port, for example, to a hands-free system provided in the motor vehicle. Connection to the vehicle's loudspeaker system is also conceivable.

The retaining elements advantageously project from the bearing surface by a length L, it being possible to adjust this length L for at least one of the retaining elements. As a result, the holding space of the holding apparatus can be adjusted not only to the length and width of the piece of equipment but also to the thickness of the piece of equipment to be held. As a result, the retaining device can be used even more flexibly and even more pieces of equipment can be held securely and stably in the retaining device. The length L for at least one of the retaining elements is adjusted, for example, via a knurled screw provided in the respective retaining element. It is of course particularly advantageous if the length L can be adjusted for each retaining element so that optimum retention of the respective piece of equipment in the retaining device can be ensured. Alternatively or additionally, it is also possible to arrange one of the displaceable retaining elements, i.e. for example one of the first retaining elements or one of the second retaining elements, at one end of an arm that can be tilted or pivoted out of the plane that is defined by the bearing surface of the holding apparatus. As a result it is also possible to grip pieces of equipment that are relatively thick using the respective retaining element. Although these pieces of equipment then no longer bear fully against the bearing surface, secure fastening inside the retaining device is, however, ensured.

The retaining device is preferably constructed so as to be arranged on a headrest of the motor vehicle. This has the advantage that the fastening can be effected in a particularly simple fashion and additionally there are no annoying components or elements of the retaining device that need to be arranged in the region of the front seats, especially in the region of the driver's seat. Especially for the case where the retaining device is arranged on the driver's seat, because of the greater degree of attention that the driver must pay to the road and the nearby traffic, it is of course extremely advantageous if there are no annoying components or other device elements of the retaining device.

It has turned out to be particularly simple if the retaining device has two stays that are arranged so that they can pivot on the holding apparatus and by means of which the retaining device can be attached to the headrest. A headrest of a motor vehicle usually comprises a padded element against which the person seated on the respective vehicle seat rests his head. This padded element is fastened to the backrest of the vehicle seat via columns that generally have an adjustable length. The retaining device needs particularly advantageously to be arranged on these columns via its two stays. This happens, for example, using hinged or clamping elements that can be hinged open and shut. In the hinged-open state, they are placed around the individual columns of the headrest and then hinged shut. In order to ensure particularly secure retention here, the clamping or hinged element can be closed using a screw connection. Padded elements, made for example from rubber or foam, can be provided inside the hinged or clamping element in order to take account of different diameters of the headrest columns. The stays with the clamping or hinged elements can thus be used universally for a large number of different motor vehicles from different motor vehicle manufacturers without there being any need to stock separate components for the individual manufacturers or even for individual vehicle types. The stays of the retaining device are preferably arranged pivotably not only on the holding apparatus but, in the mounted state, also pivotably on the headrest columns. In this way it is possible to pivot the holding apparatus of the retaining device such that several people seated on the back seat of a motor vehicle can see the display of the piece of equipment. If, for example, several children on the back seat of a motor vehicle want to watch the same film, in this way it is possible to pivot the display of a piece of equipment situated in the holding apparatus of the retaining device a little so that all the people seated on the back seat can easily see the display or even operate it.

The holding apparatus can advantageously pivot about a second axis of pivoting that is perpendicular to the first axis of pivoting. By virtue of this pivotability, the display of a piece of equipment situated in the retaining device can be moved from a vertical position into an inclined position and thus, for example, light coming through the side or rear window of the motor vehicle can be prevented from striking the display.

This pivotability can also be designed in a stepless fashion, for example using a clamping mechanism, or can permit pivoting only over certain distances. This can be ensured, for example, via discs provided with teeth that engage with one another. To lock or arrest the holding apparatus in a certain position pivoted about the second axis of pivoting, the two discs provided with teeth or other toothed elements are pressed against each other in such a way that further pivoting about the second axis of pivoting is impossible. To change the position of the holding apparatus again and bring about a pivoting about the second axis of pivoting, the two toothed elements are pushed apart, for example via a spring element, so that pivoting is possible.

Using a retaining device described here, it is consequently possible to fasten pieces of equipment that are provided with a display and have very different sizes and weights securely and simply inside a motor vehicle and nevertheless to ensure that the pieces of equipment can be used flexibly.

DESCRIPTION OF THE DRAWINGS

An exemplary embodiment of the present invention is described in detail below with the aid of drawings, in which:

FIG. 7a shows a schematic view from above of the retaining device according to an exemplary embodiment of the present invention, with the pivoting about the second axis of pivoting unlocked, and a cross-section along the line A-A in the upper region, FIG. 7b shows a cross-section through the lower part of FIG. 7a, FIG. 8a shows the view from FIG. 7a in the locked state, and a cross-section along the line A-A in the upper region, FIG. 8b shows the view from FIG. 7b in the locked state, FIG. 14 shows a front and a side view of a holding apparatus of a retaining device.

DETAILED DESCRIPTION

Figure 1:
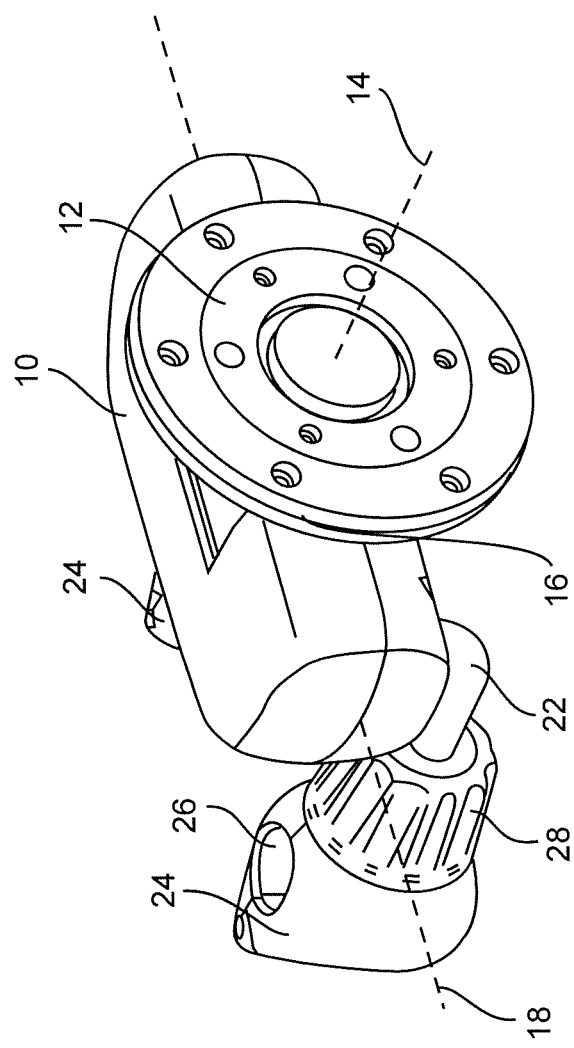
FIG. 1 shows a schematic view of part of a retaining device according to a first exemplary embodiment of the invention.
Figure 10:
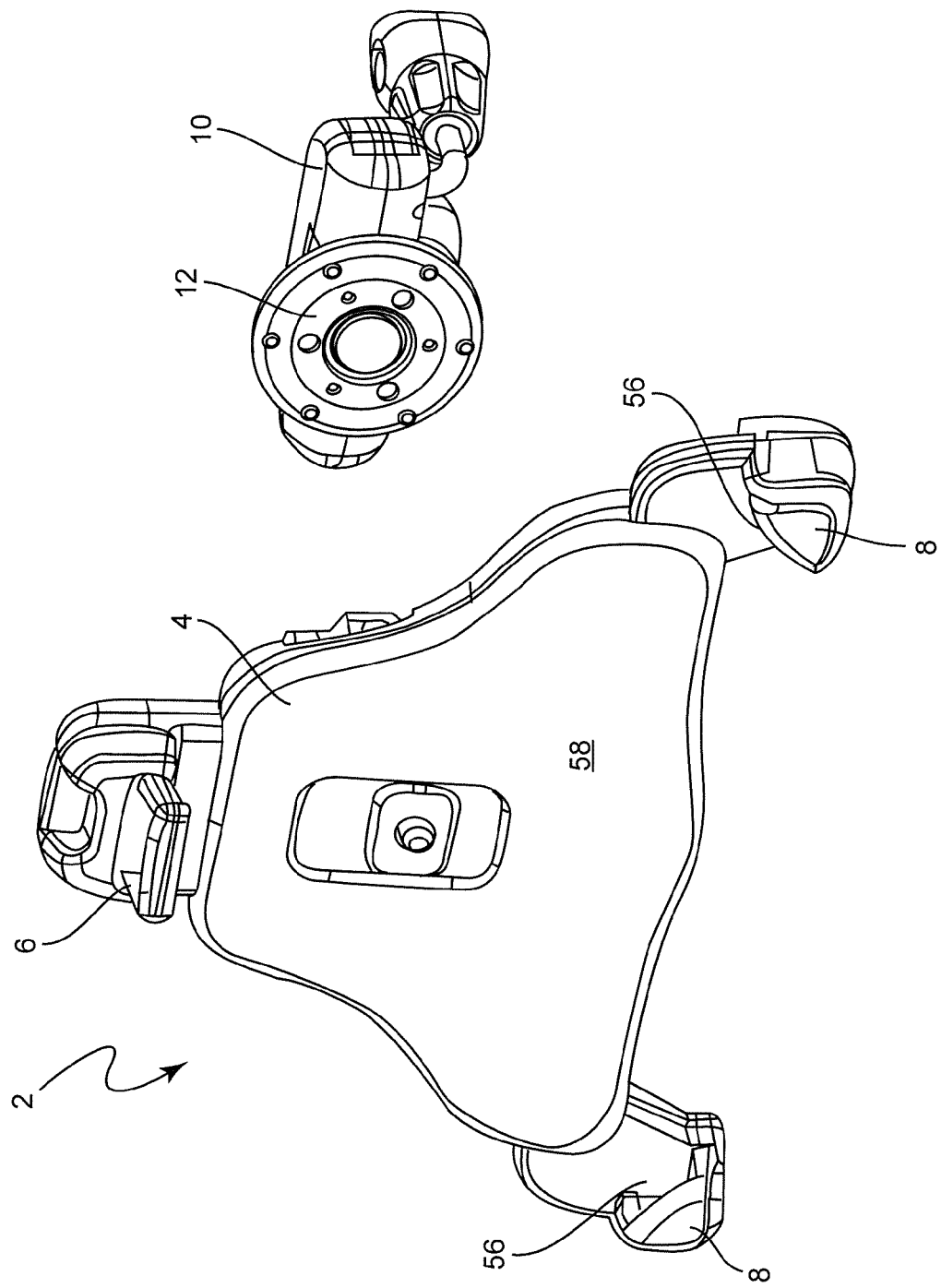
FIG. 10 shows a schematic view of a retaining device, disassembled into two parts, according to a further exemplary embodiment of the present invention.

FIG. 1 shows part of a retaining device according to a first exemplary embodiment of the present invention. Not shown is a holding apparatus 2 with a bearing surface 4, a first retaining element 6 and a second retaining element 8. This is shown in FIGS. 10 et seq.

A base body 10, on which a retaining plate 12 is arranged, can be seen, however. The holding apparatus 2 with the bearing surface 4 and the retaining elements 6, 8 is arranged on the retaining plate 12. The structural design that enables the first retaining elements 6 and the second retaining elements 8 to be displaced may also be arranged on this retaining plate 12 as a structural unit with the bearing surface 4. A first axis of pivoting 14, shown in dashed lines, runs through the middle of the retaining plate 12. The retaining plate 12, which is fastened in a guide element 16, can pivot about this first axis of pivoting 14. The guide element 16 itself can pivot, with the retaining plate 12 fastened to it and the holding apparatus 2 (not shown), about a second axis of pivoting 18 that is perpendicular to the first axis of pivoting 14. This can be seen more clearly in particular in FIG. 2, in which a pivot element 20 is shown on the guide element 16.

Figure 2:
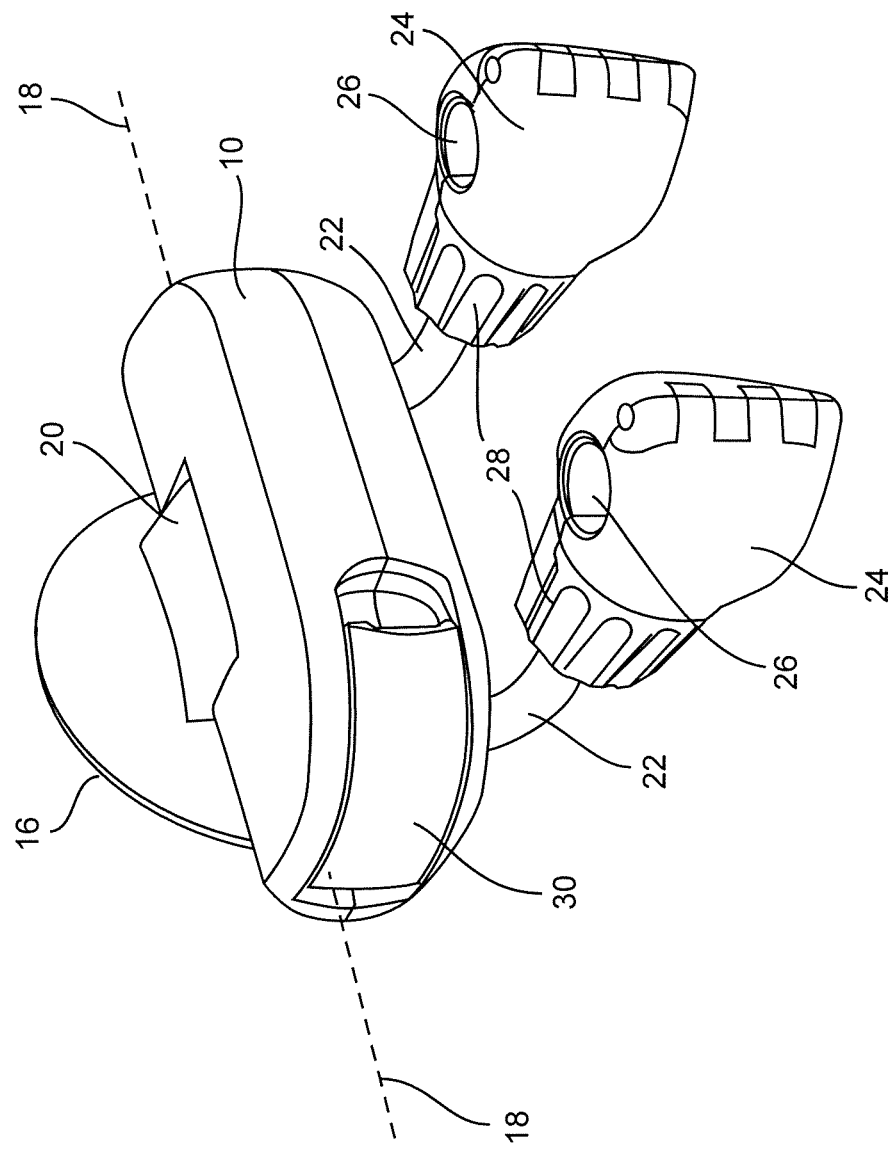
FIG. 2 shows a different view of the view in FIG. 1, FIGS. 3a-3c show the retaining device from FIGS. 1 and 2 in the neutral position, the first deflected position and the second deflected position.

As shown in FIGS. 1 and 2, two stays 22 are arranged on the base body 10 and hinged elements 24 are situated at their ends, via which the retaining device can be fastened to columns of a headrest of a motor vehicle. The hinged elements 24 each have a through opening 26 into which the columns of the headrest are introduced when the hinged elements 24 are hinged open. The hinged elements 24 also have screw elements 28 by means of which the hinged elements 24 are held in the closed state.

A pivot lever 30 that can be moved into an opened and a closed state can also be seen in FIG. 2. The pivot lever 30 is shown in the closed state in FIG. 2. The pivot element 20 and the guide element 14, with the retaining plate 12, fastened to it are allowed to pivot or blocked from pivoting by this pivot lever 30.

As shown in FIG. 1, the actual retaining plate 12 that can be pivoted relative to the guide element 16 constitutes only the inner part of the plate shown there. This is shown in detail in FIGS. 3a to 3c.

Figure 3A:
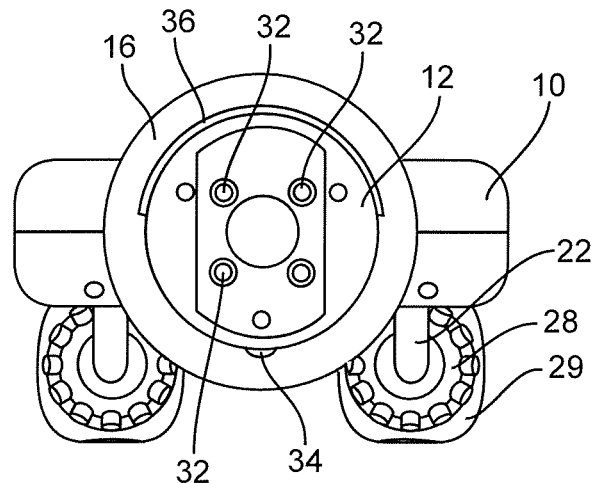
Figure 3B:
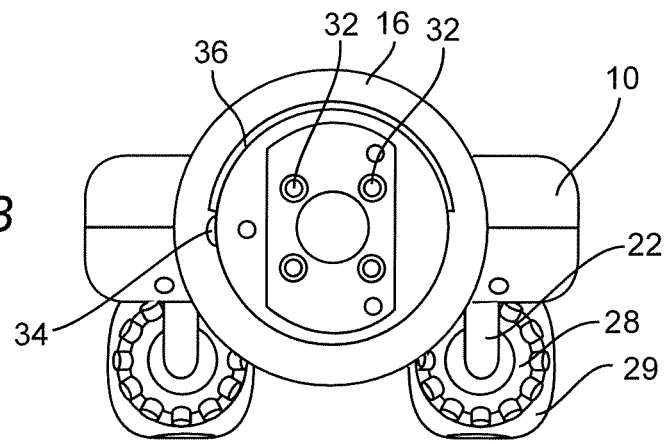
Figure 3C:
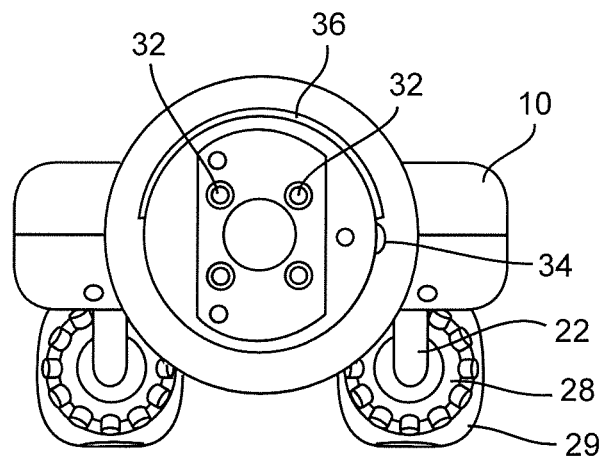

FIGS. 3a to 3c show the retaining device from FIGS. 1 and 2 in a view along the first axis of pivoting 14. The two stays 22, the hinged elements 24 and the screw elements 28 can be seen. The stays 22 are arranged on the base body 10 of the retaining device. FIG. 3a shows the retaining plate 12 in the neutral position. Components and elements that lie behind the retaining plate 12 and the guide element 16 and hence should not actually be visible in this view are shown. These are, inter alia, catch elements 32 that ensure that the retaining plate 12 is arrested and engages in the individual positions. Inadvertent displacement by, for example, vibrations that can be caused when the motor vehicle is being driven is thus excluded.

A projection 34 that interacts with a stop 36 arranged on the guide element 16 and thus prevents further pivoting of the retaining plate 12 about the first axis of pivoting 14 relative to the guide element 16 is arranged on the retaining plate 12. FIG. 3b shows the situation shown in FIG. 3a, but in which the retaining plate 12 is now situated in the first deflected position. It can be seen that the projection 34 now bears against one end of the stop 36 and thus prevents further clockwise pivoting of the retaining plate 12. When the retaining plate 12 pivots anticlockwise relative to the guide element 16 out of the first deflected position shown in FIG. 3b, the retaining plate 12 is moved back into the neutral position shown in FIG. 3a.

FIG. 3c shows the retaining plate 12 in the second deflected position in which the projection 34 now bears against the second end of the stop 36. Further anticlockwise pivoting of the retaining plate 12 about the first axis of pivoting is impossible.

Figure 4:
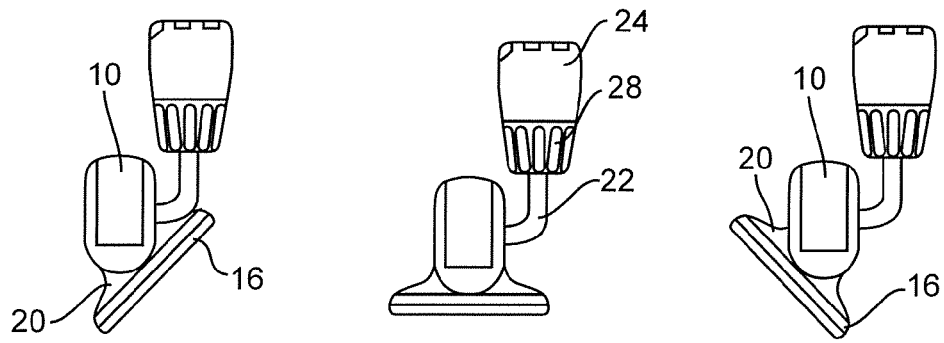
FIG. 4 shows the retaining device from FIGS. 1 to 3 in different pivoted states about the second axis of pivoting.

FIG. 4 shows three different schematic views of the retaining device from the preceding Figures along the second axis of pivoting 18. It can be seen that the retaining plate 12 or the guide element 16 holding the retaining plate 12 is shown in three different pivoted positions. This pivoting can take place steplessly or in individual steps, and the retaining plate 12 and the remainder of the holding apparatus 2 (which is not shown in the Figures) can be arrested in each position shown.

Figure 5:
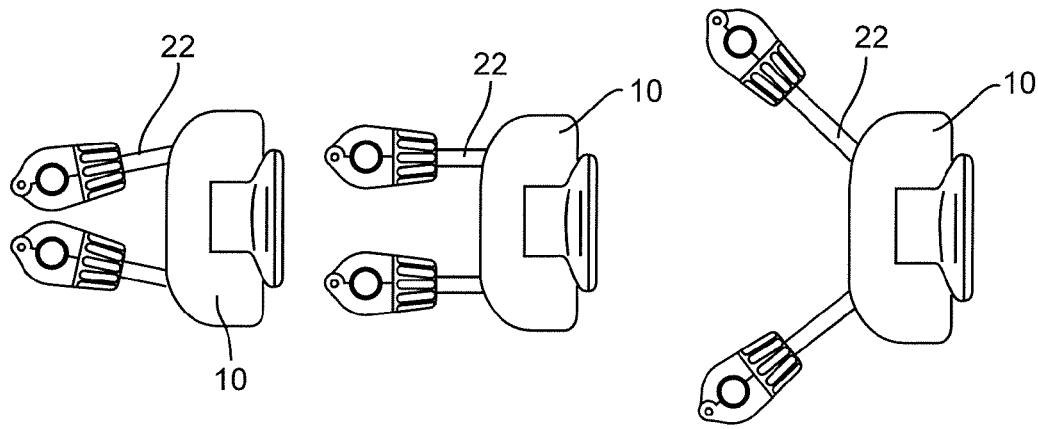
FIG. 5 shows the retaining device from the preceding Figures in further views from above.

FIG. 5 shows a view from above of the retaining device from the preceding Figures. The ability to pivot of the stays 22, which are fastened pivotably to the base body 10, can be seen. It is thereby ensured that there is no need to stock different retaining devices for different types of vehicle that may possibly be produced by different vehicle manufacturers and may have different spacings for the individual columns of the headrest. Because the stays 22 are mounted pivotably on the base body 10 and hence also relative to the remainder (not shown) of the holding apparatus, the retaining device can be arranged on a large number of different headrests.

Figure 6:
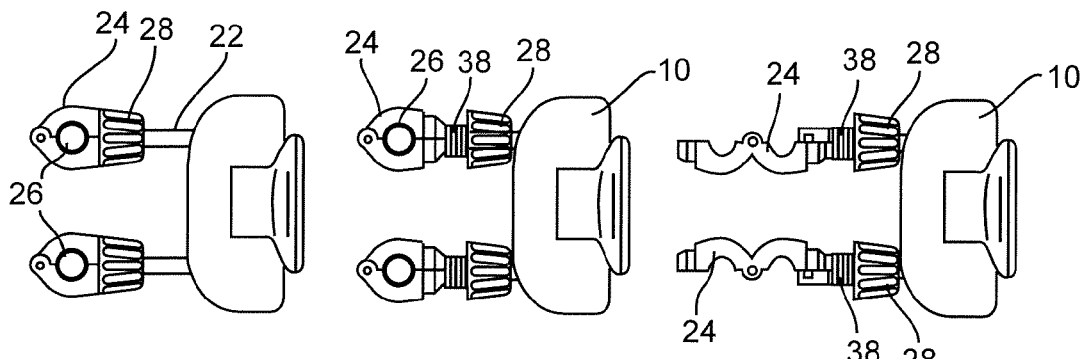
FIG. 6 shows the operation of the stays of the retaining device.

FIG. 6 illustrates the manner in which the retaining device is arranged on columns (not shown) of a headrest.

The hinged-open hinged elements 24 can be seen in the drawing on the right. The screw elements 28 have each been unscrewed from a thread 38 so that the hinged elements 24 can be hinged open. In this state, the hinged elements are placed between the columns of a headrest (not shown). The hinged elements are then closed so that the columns of the headrests are situated in the through openings 26 of the hinged elements 28. This situation is shown in the middle drawing of FIG. 6.

In this state, by screwing the screw element 28 onto the respective thread 38 it is possible to prevent the hinged elements 24 from opening and hence ensure that the retaining device is securely fastened to the headrest of the motor vehicle. This situation is shown in the drawing on the left in FIG. 6. If the retaining device needs to be removed from the motor vehicle again, the screw elements 28 are simply unscrewed so that the hinged elements 24 can be hinged open again and the retaining device can be removed from the headrest of the motor vehicle. Particularly simple mounting of the retaining device in the motor vehicle is ensured in this way.

The lower part of FIG. 7a shows a schematic view from above of the retaining device from the preceding Figures. The pivot lever 30, now situated in the open state, can be seen. A cross-section along the line A-A from the lower part of FIG. 7a is shown in the upper part of FIG. 7a. FIG. 7b shows the view from the lower part of FIG. 7a, with the cover of the base body 10 removed. The pivot lever 30, situated in the open position, can be seen in all the views shown. It is connected to one end of a pin 40 that extends through the entire base body 10 in the Figures shown. It is tensioned by a spring 42 at the end opposite the pivot lever 30. When the pivot lever 30 is open, the pin 40 is displaced to the left in FIG. 7b by the spring 42. It can be see that toothed plates or toothed discs 44, which interact with racks 46 arranged on the pivot element 20, are arranged on the pin 40. In the state shown in FIGS. 7a and 7b, the toothed discs 44 fastened to the pin 40 are moved away from the racks 46 by the spring 42 so that they do not engage with one another. The pivot element 20 can thus pivot about the second axis of pivoting 18 with no difficulty.

FIGS. 8a and 8b show the view from FIGS. 7a and 7b in the locked state of the pivot lever 30. The pin 40 in the exemplary embodiment shown in the Figures is pulled to the right when the pivot lever 30 is folded in. The spring 42 is consequently compressed, as can be seen clearly in particular in FIG. 8b. As a result, the racks 46 that are situated on the pivot element 20 are brought into engagement with the toothed discs 44 that are connected to the pin 40. Further pivoting of the pivot element 20 about the second axis of pivoting, which preferably coincides with the pin 40, is no longer possible.

In this way it is possible to ensure pivoting of the pivot element 20 that can be arrested at very small distances, and hence also of the holding apparatus 2 about the second axis of pivoting.

Figure 9:
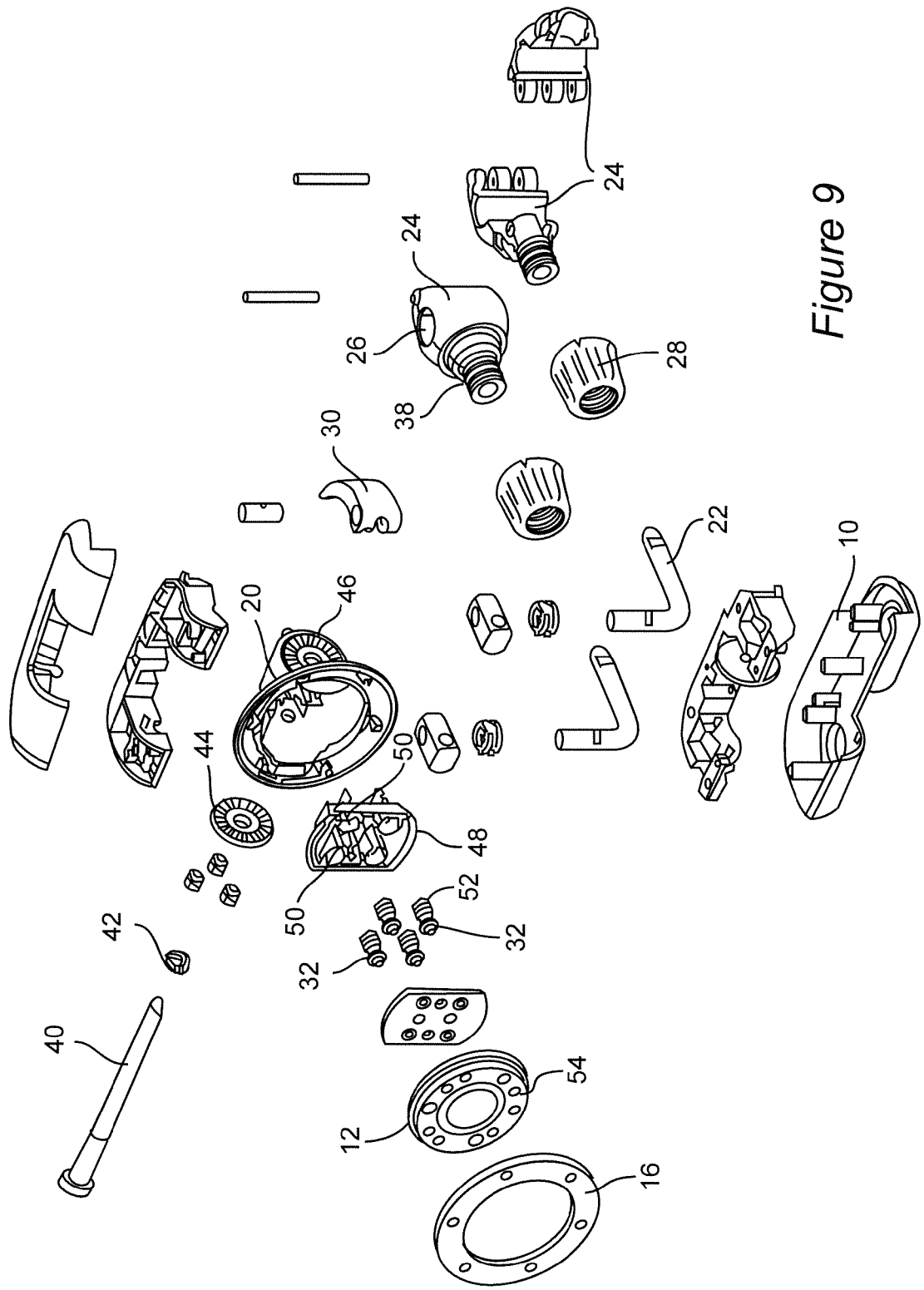
FIG. 9 shows an exploded view.

FIG. 9 shows an exploded view of the retaining device from the preceding Figures. Visible are the pivot lever 30, the pin 40, fastened to the latter, with the spring 42, and the toothed discs 44 and annularly arranged racks 46 that are arranged on the pivot element 20. A moulded part 48, in which four recesses 50 are provided into which a catch element 32 with an associated catch spring 52 is introduced respectively, is situated inside the pivot element 20. The catch elements 32 are designed so as to engage in indentations 54 in a separate component provided for this purpose when the retaining plate 12 that is non-rotatably connected to the separate component is situated in the neutral position, the first deflected position or the second deflected position. If the retaining plate 12 is turned into another of the positions mentioned, the catch elements 32 just need to be pushed out of the indentations 54 counter to the action of the catch springs 52.

The right-hand part of FIG. 10 shows the part of the retaining device that is already known from the preceding Figures. The left-hand part shows the holding apparatus 2 that has a displaceable first retaining element 6 and two displaceable second retaining elements 8. The second retaining elements 8 can thus be displaced to the right and left so that the spacing between the two second retaining elements 8. Because the two second retaining elements 8 are designed as corner retainers, they are constructed so as to each hold a corner of a piece of equipment to be inserted in the holding apparatus 2 in an undercut 56 provided for this purpose in each of the second retaining elements 8.

The second retaining elements 8 and the first retaining element 6 together delimit with the bearing surface 4 a holding space 58 in which a piece of equipment 72 can be held. The extent of the holding space 58 in a first direction is delimited at one end by the lower side of the two second retaining elements 8 and at the other end by the first retaining element 6. Because the first displaceable retaining element 6 can be displaced up and down in the Figure shown, the amount by which the holding space 58 extends in this direction can be adjusted. Because the spacing between the two second retaining elements 8 can be adjusted, the amount by which the holding space 58 extends in a second direction, perpendicular to the first direction, can also be adjusted.

The holding apparatus shown is arranged on the retaining plate 12 and can thus be turned relative to the base body 10.

Figure 11:
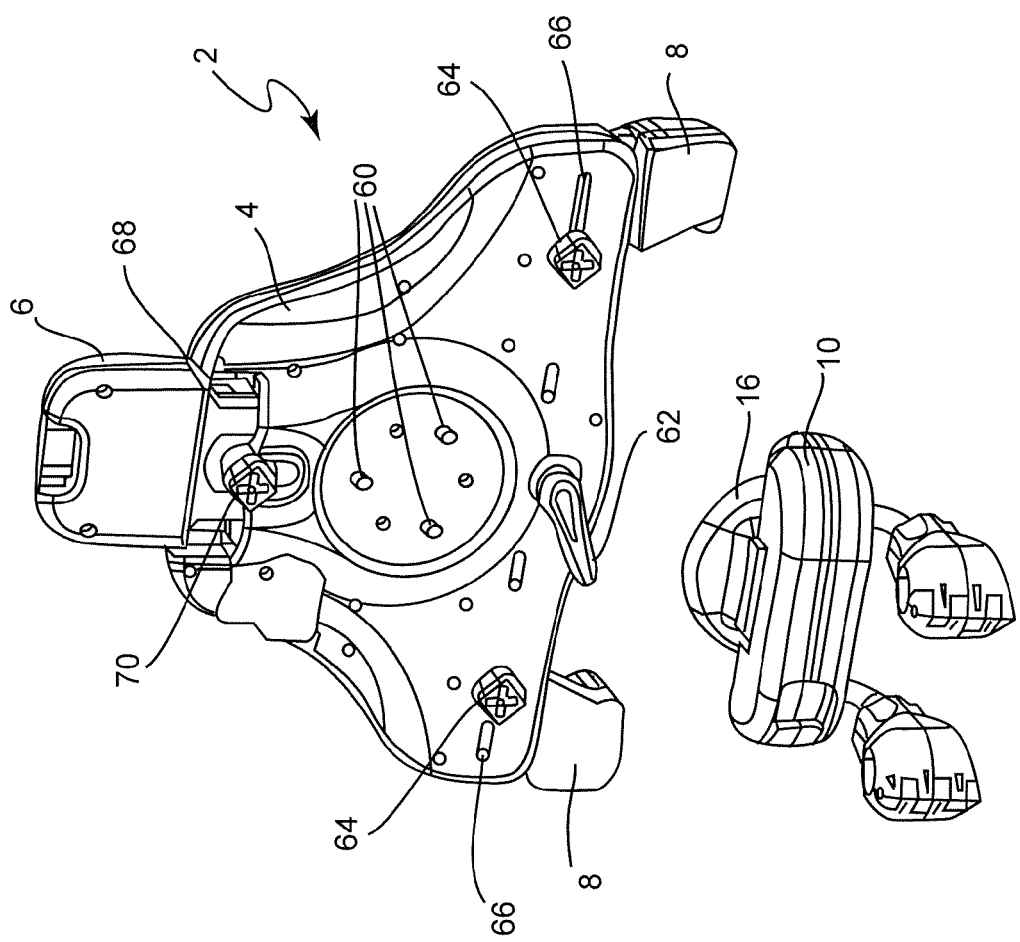
FIG. 11 shows a view of the retaining device according to FIG. 10 from a different viewpoint.

FIG. 11 shows a view from the rear of the retaining device from FIG. 10, disassembled into two parts. The component known from FIG. 1, with the base body 10 and the guide element 16 situated thereon, is shown again in the lower part. The upper part shows the holding apparatus 2 which, in the example shown, has three fastening elements 60 on the rear of the bearing surface 4 and via which the holding apparatus 2 is non-rotatably fastened to the retaining plate 12 (not shown in FIG. 11).

FIG. 11 shows the first displaceable retaining element 6 again, which can be displaced up and down in FIG. 11. This happens in a stepless fashion and can be locked via a locking lever 62. When the locking lever 62 is moved into a locked position, a slide element that is fastened to the first retaining element 6 and can slide along in a guide is clamped and thus fixed in the desired position.

The two second retaining elements 8 are also mounted so that they can be displaced. However, they are here capable of being displaced in a direction perpendicular to the direction in which the first retaining element 6 can be displaced. In the example shown, the two second retaining elements 8 can be displaced separately from each other to the right and left. A pin provided with a fixing element 64 thus slides in a slot 66 provided for this purpose. The pin is connected to the respective second retaining element 8 so that when the pin is displaced it causes the respective second retaining element 8 to be displaced. Here too the pin can be fixed in the desired position in the slot 66 by means of the fixing element 64 so that the second retaining element 8 can be displaced steplessly too.

The first retaining element 6 is fastened to a slide 68 that can slide along the rear of the bearing surface 4. The spacing between the slide 68 and the housing that forms the bearing surface 4 can be adjusted via a spacing element 70 that takes the form of a screw so that the slide 68 can be tilted relative to the bearing surface 4. In this way, the first retaining element 6 is tilted too and so changes the spacing from the bearing surface 4 so that in this way the holding apparatus 2 and hence the retaining device can be adjusted to the thickness of a piece of equipment to be held.

Figure 12:
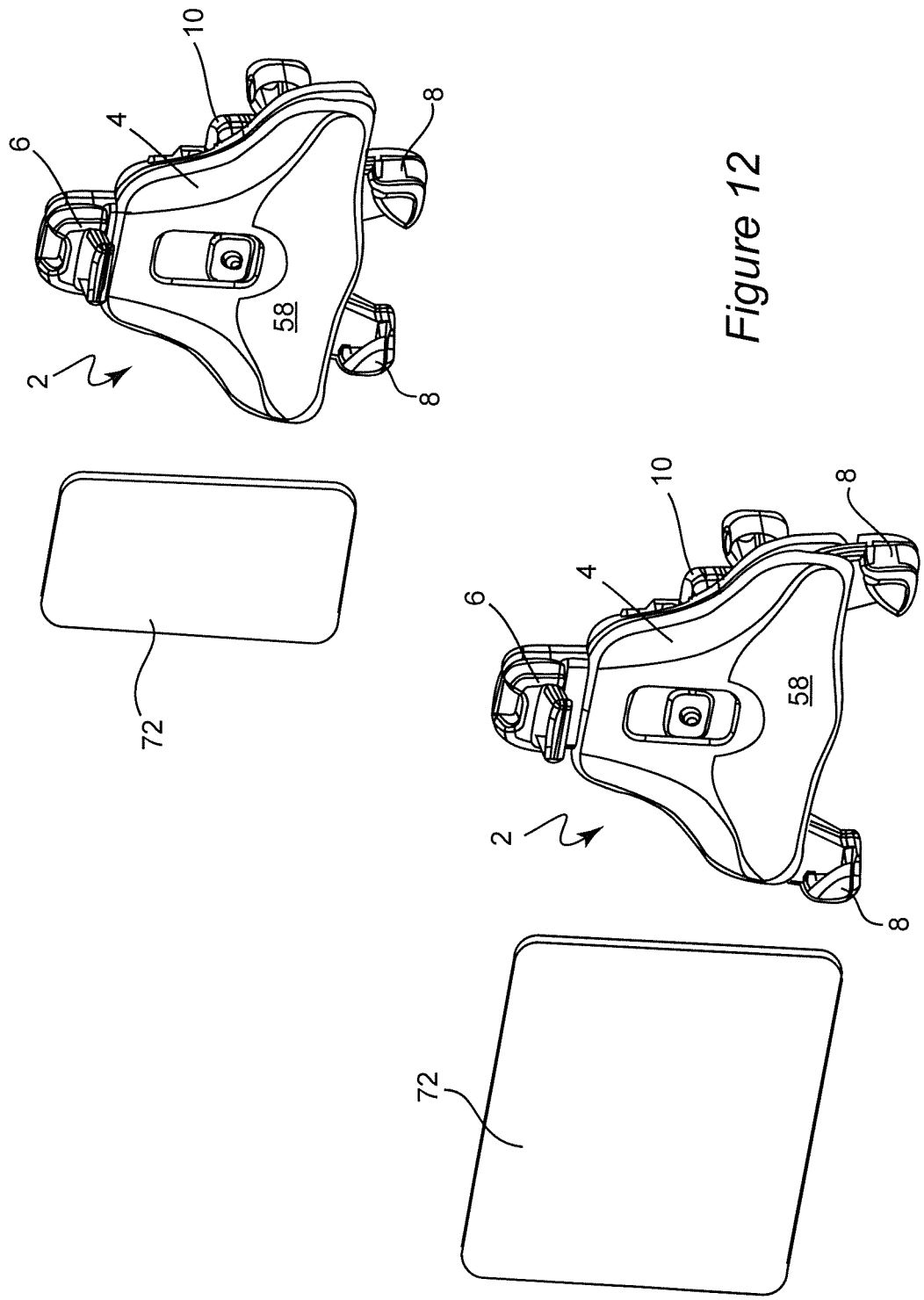
FIG. 12 shows respective views of a retaining device for holding pieces of equipment of different sizes.

FIG. 12 shows a retaining device in two settings for holding pieces of equipment 72 of different sizes.

In the upper right-hand part, the piece of equipment 72 to be held is relatively small in design. The length, i.e. the extent in the longitudinal direction, from bottom to top in the top right-hand part of FIG. 12, is thus shorter than a maximum extent up to which the extent of the holding space 58 in a direction from top to bottom can be enlarged. The piece of equipment 72 is therefore in this case held in a portrait position. This means that the spacing between the two second retaining elements 8 is adjusted to the width, i.e. the extent from left to right, of the piece of equipment 72. This spacing between the two second retaining elements 8 corresponds to the amount by which the holding space 58 extends in the second direction. The amount by which the holding space 58 extends in the first direction, running from bottom to top in FIG. 12, is determined by the length of a line joining the second retaining elements 8 and the first retaining element 6. This amount by which the holding space 58 extends is adjusted to the length of the piece of equipment 72.

The lower left-hand part of FIG. 12 shows the situation for a piece of equipment 72 with a length, which in this example extends from left to right, that is greater than the maximum extent up to which the amount by which the holding space 58 extends in the first direction can be enlarged. The piece of equipment 72 therefore needs to be held in the holding apparatus in landscape format. This means that the spacing between the two second retaining elements 8 is adjusted to the length of the piece of equipment 72. The length of a piece of equipment is thus always the length of the longer side edges, whilst the width corresponds to the length of the shorter side edges. In the present case, the amount by which the holding space 58 extends in a first direction is consequently adjusted to the width of the piece of equipment 72 by the first retaining element 6 being displaced in a desired fashion. The amount by which the holding space 58 extends in the second direction is adjusted to the length of the piece of equipment 72 by displacing the two second retaining elements 8.

Figure 13:
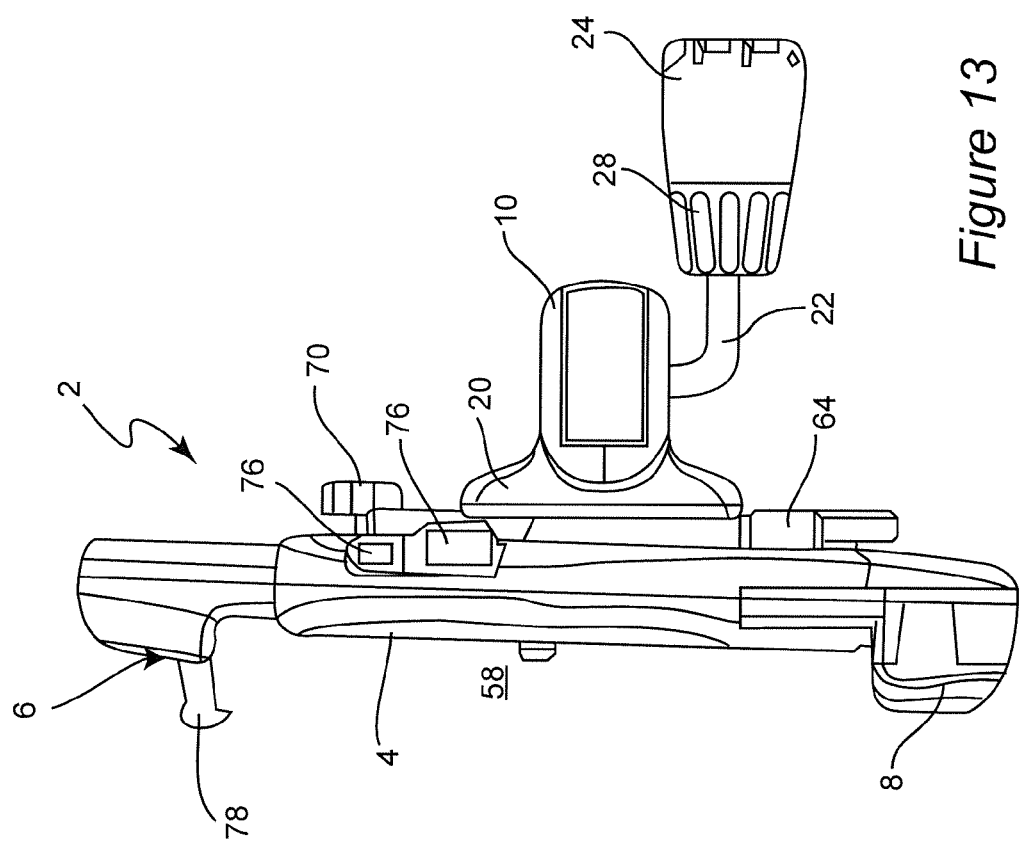
FIG. 13 shows a side view of the retaining device according to an exemplary embodiment of the present invention.

FIG. 13 shows a side view of a retaining device according to a further exemplary embodiment of the present invention. The holding apparatus 2, which is arranged on the pivot element 20 and via this on the base body 10 of the retaining device, can be seen. The stays 22 with the hinged elements 24 situated thereon and which are closed by the screw element 28, are situated on the base body 10. The holding apparatus 2 has the two second retaining elements 8, only one of which is shown, and a first retaining element 6 that has a hook-like projection 74 that is designed to grip a side edge of a piece of equipment 72 to be inserted.

The holding space 58 is delimited by the bearing surface 4 on the side facing the base body 10.

It can be seen that the holding apparatus 2, and hence the holding device, has two data ports 76 that can be connected to corresponding interfaces of the piece of equipment to be inserted, for example via a cable. Such data ports 76 can, for example, take the form of USB or mini USB ports or other types of port. The spacing element 70 can also be seen in FIG. 13 which, when actuated, causes the slider 68 on which the first retaining element 6 is situated to be tilted relative to the bearing surface 4. The fixing elements 64, by means of which the second retaining elements 8 can be arrested in the desired position, are also shown.

The left-hand part of FIG. 14 shows a front view of the holding apparatus 2. The first retaining element 6 with the hook-like projection 74, which can be displaced up and down in the view shown, can be seen. The bearing surface 4 delimits the holding space 58 and the two second retaining elements 8, which are again designed as corner retaining elements, can be displaced separately to the right and left in the exemplary embodiment shown.

It is of course also conceivable to provide just one second retaining element 8 that is designed so that it can be displaced. In addition, the second retaining elements 8 do not need to be designed as corner retaining elements. It is just as conceivable to provide an additional, for example fixed, separate retaining element by means of which it is possible to limit at the bottom the amount by which the holding space 58, in which the piece of equipment 72 can be held, extends. The first direction $R_1$ and the second direction $R_2$ are additionally shown in FIG. 14 by a double-headed arrow.

The holding apparatus 2 is shown in a side view in the right-hand part of FIG. 14. The view here corresponds to the view of the holding apparatus 2 in FIG. 13 except that the first retaining element 6 with the hook-like projection 74 is now tilted at an angle with respect to the bearing surface 4. As a result, the spacing of the hook 78 of the hook-like projection 74 from the bearing surface 4 is changed. It is consequently possible to hold pieces of equipment 72 of different thicknesses securely in the holding apparatus 2 and hence in the retaining device. Also shown are the data ports 76, the second retaining elements 8 with the associated fixing element 64, and (schematically) the fastening elements 60.

Figure 15:
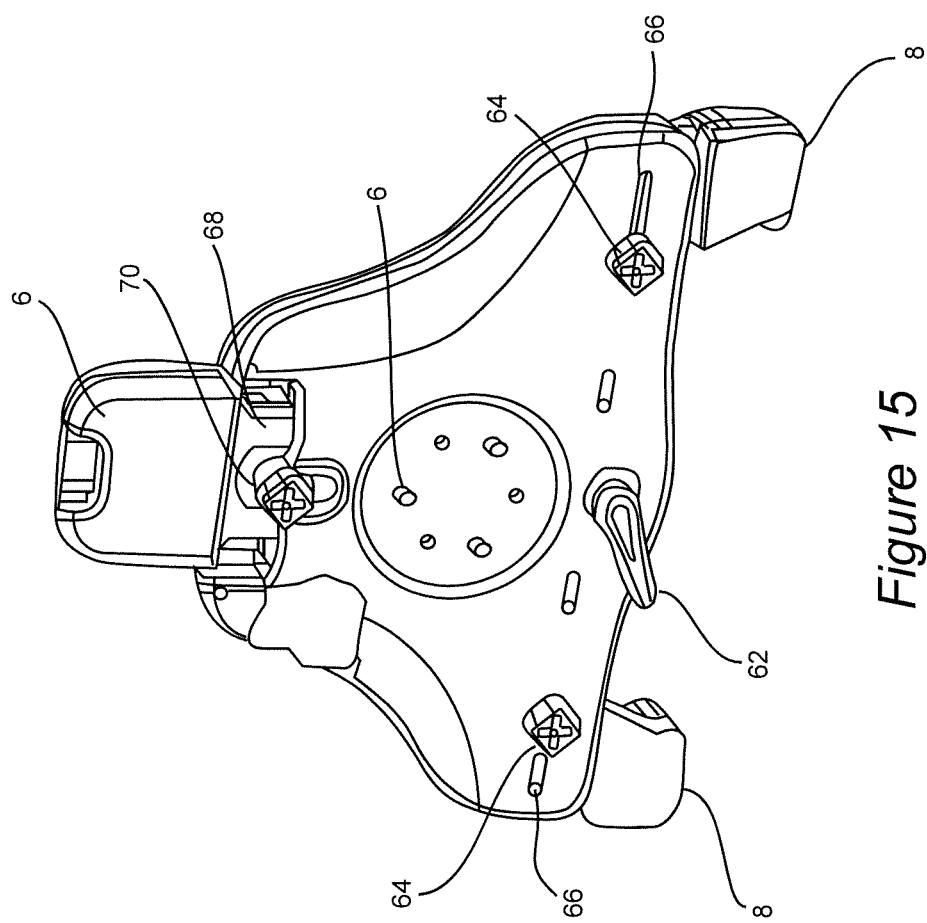
FIG. 15 shows a view from the rear of a holding apparatus.

FIG. 15 shows the holding apparatus 2 in a view from the rear. It thus corresponds to the view from FIG. 11.

Figure 16:
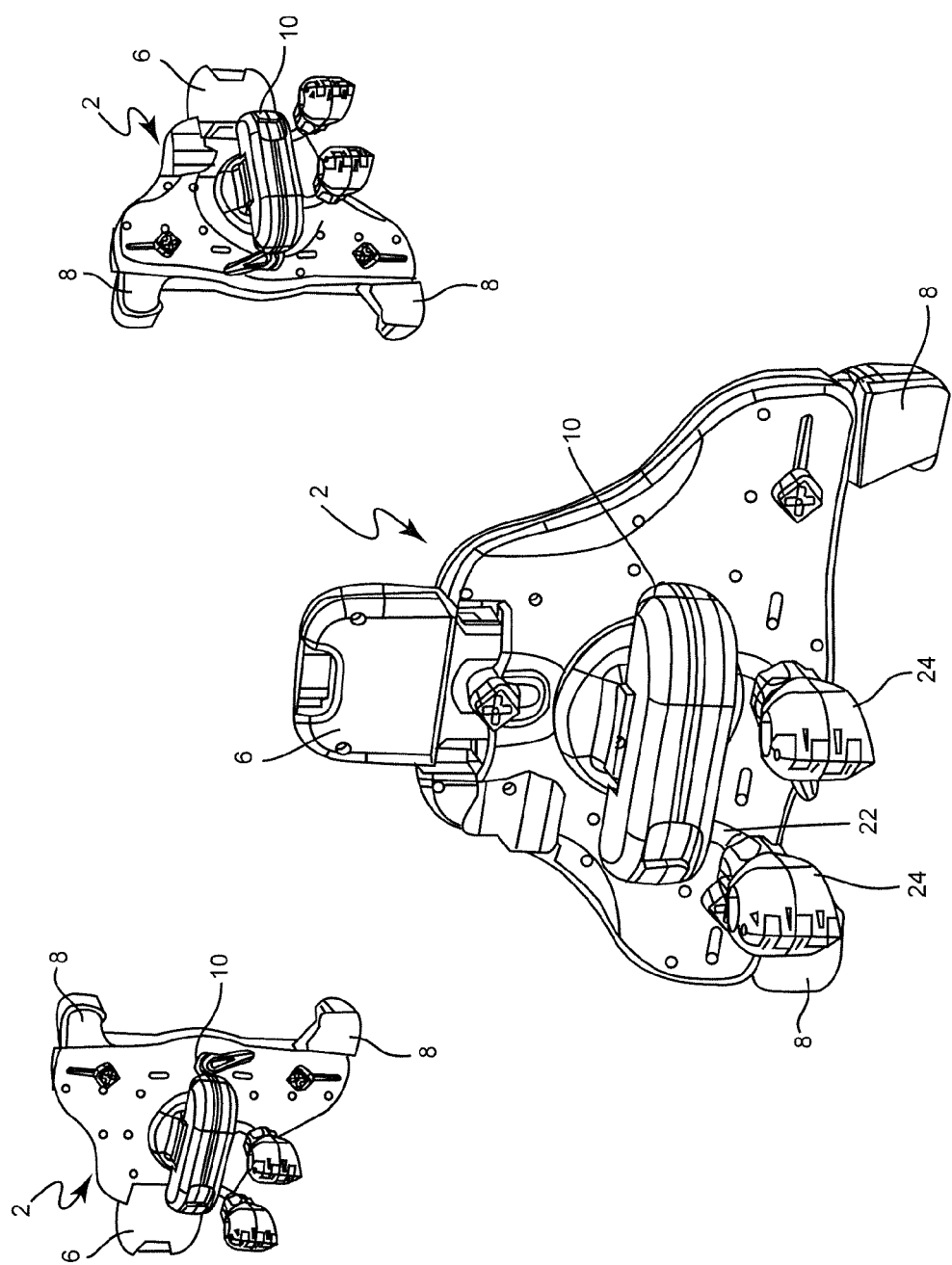
FIG. 16 shows the view from the rear of a retaining device in the neutral position, the first deflected position and the second deflected position.

FIG. 16, on the other hand, shows a complete retaining device according to an exemplary embodiment of the present invention in a view from the rear in three different positions. The holding apparatus 2 is shown in the neutral position in the middle part of FIG. 16. It can be seen that the first retaining element 6 is arranged at the top. The two smaller views at the top on the left and right in FIG. 16 show the retaining device in the first deflected position (top left) and in the second deflected position (top right).

In the view at the top left, the holding apparatus 2 has been pivoted anticlockwise by 90° about the first axis of pivoting 14 relative to the base body 10. The first retaining element 6 is now situated on the left, while the two second retaining elements 8 represent the right-hand edge of the holding space 58 (not shown).

In the view at the top right, the holding apparatus 2 is situated in the second deflected position into which it has been moved by pivoting it clockwise by 90° out of the neutral position shown in the middle. The first retaining element 6 is now situated on the right, while the two second retaining elements 8 form the left-hand edge region of the holding space 58 (not shown).

The catch elements 32 shown by way of example in FIG. 9 ensure that the holding apparatus 2 snaps into place in each of the three positions shown and is not removed from one of the positions, for example, inadvertently by vibrations caused when the motor vehicle is being driven.

LIST OF REFERENCE SYMBOLS 2 holding apparatus
4 bearing surface
6 first retaining element
8 second retaining element
10 base body
12 retaining plate
14 first axis of pivoting
16 guide element
18 second axis of pivoting
20 pivot element
22 stay
24 hinged element
26 through opening
28 screw element
30 pivot lever
32 catch element
34 projection
36 stop
38 thread
40 pin
42 spring
44 toothed disc
46 rack
48 moulded part
50 recess
52 catch spring
54 indentation
56 undercut
58 holding space
60 fastening element
62 locking lever
64 fixing element
66 slot
68 slide
70 spacing element
72 piece of equipment
74 projection
76 data port
78 hook
$R_1$ first direction
$R_2$ second direction

The invention claimed is:

1. A retaining device for fastening a piece of equipment equipped with a display inside a motor vehicle, the piece of equipment having a length and a width where the width is less than the length, the retaining device comprising:
    a holding apparatus with a bearing surface and a holding space for holding the piece of equipment,
        said holding space extending in a first direction ($R_1$) by an amount that is limited by at least one displaceable first retaining element displaceable in the first direction, and
        the holding space extending in a second direction ($R_2$) perpendicular to the first direction ($R_1$) by an amount that is limited by at least one displaceable second retaining element displaceable in the second direction;
    a base body positioned behind said holding apparatus; and
    a retaining plate, said holding apparatus and said base body being secured together using said retaining plate,
    wherein the holding apparatus is pivotable by at the most 90° in a clockwise direction from a neutral position to a first deflected position about a first pivot axis which passes through said bearing surface of said holding apparatus, said retaining plate, and said base body,
    wherein the holding apparatus is pivotable by at the most 90° in an anticlockwise direction from said neutral position to a second deflected position about said first pivot axis, and
    wherein the holding apparatus is configured to be positioned in at least one of said neutral position, said first deflected position, and said second deflected position.

2. The retaining device according to claim 1, wherein the at least one displaceable second retaining element includes two displaceable second retaining elements, the spacing between the two displaceable second retaining elements defining the amount by which the holding space extends in the second direction ($R_2$).

3. The retaining device according to claim 2, wherein the two displaceable second retaining elements can be displaced independently of each other.

4. The retaining device according to claim 2, wherein the holding apparatus is pivotable by 90° in at least two directions from the neutral position about the first pivot axis.

5. The retaining device according to claim 1, wherein the retaining device has at least one power and/or data port.

6. The retaining device according to claim 1, wherein the at least one first retaining element projects from the bearing surface by a length L, and further comprising means for adjusting the length L.

7. The retaining device according to claim 1, further comprising means to secure the base body to a headrest of a motor vehicle.

8. The retaining device according to claim 7, wherein the means to secure the base body to the headrest of the motor vehicle has two stays that are arranged on said base body so that they can pivot relative to the holding apparatus.

9. The retaining device according to claim 1, wherein the holding apparatus can pivot about a second axis of pivoting which passes through said base body and that is perpendicular to the first axis of pivoting.

10. A retaining device for fastening a piece of equipment equipped with a display inside a motor vehicle, the piece of equipment having a length and a width where the width is less than the length, the retaining device comprising:
 a holding apparatus with a bearing surface and a holding space for holding the piece of equipment,
  said holding space extending in a first direction ($R_1$) by an amount that is limited by at least one displaceable first retaining element displaceable in the first direction, and
  the holding space extending in a second direction ($R_2$) perpendicular to the first direction ($R_1$) by an amount that is limited by at least one displaceable second retaining element displaceable in the second direction;
 a base body positioned behind said holding apparatus; and
 a retaining plate, said holding apparatus and said base body being secured together using said retaining plate,
 wherein the holding apparatus is pivotable by at the most 90° in a first direction from a neutral position to a first deflected position about a first pivot axis which passes through said bearing surface of said holding apparatus, said retaining plate, and said base body,
 wherein the holding apparatus is pivotable by at the most 90° in a second direction from said neutral position to a second deflected position about said first pivot axis, said second direction is opposite to said first direction, and
 wherein the holding apparatus is configured to be positioned in at least one of said neutral position, said first deflected position, and said second deflected position.

11. A retaining device for fastening a piece of equipment equipped with a display inside a motor vehicle, the piece of equipment having a length and a width where the width is less than the length, the retaining device comprising:
 a holding apparatus with a bearing surface and a holding space for holding the piece of equipment,
  said holding space extending in a first direction ($R_1$) by an amount that is limited by at least one displaceable first retaining element displaceable in the first direction, and
  the holding space extending in a second direction ($R_2$) perpendicular to the first direction ($R_1$) by an amount that is limited by at least one displaceable second retaining element displaceable in the second direction;
 a base body positioned behind said holding apparatus; and
 a retaining plate, said holding apparatus and said base body being secured together using said retaining plate,
 wherein the holding apparatus is pivotable by at the most 90° in at least one direction from a neutral position to a deflected position about a first pivot axis which passes through said bearing surface of said holding apparatus, said retaining plate, and said base body, and
 wherein the holding apparatus is configured to be positioned in at least one of said neutral position and said deflected position.

* * * * *